United States Patent Office 2,881,115
Patented Apr. 7, 1959

2,881,115
PRODUCTION OF AMYLOGLUCOSIDASE

Robert Winston Liggett, Philadelphia, Pa., Wayne C. Mussulman and Delmar F. Rentshler, Decatur, Ill., and Jack Ziffer, Milwaukee, Wis., assignors to A. E. Staley Manufacturing Company, Decatur, Ill., a corporation of Delaware No Drawing. Application May 21, 1954
Serial No. 432,304

(Filed under Rule 47(a) and 35 U.S.C. 116)

4 Claims. (Cl. 195—66)

This invention relates generally to innovations and improvements in the production of amyloglucosidase enzyme and enzyme liquors which are especially useful for digesting starch to produce edible high D.E. (dextrose equivalent) syrups from which crystalline dextrose may be readily obtained. The invention relates particularly to the use of an *Aspergillus phoenicis* fungus to produce amyloglucosidase characterized by its freedom from alpha amylase and a notably increased dextrose-producing activity.

In accordance with the present invention, it has been found that a fungus classified as *Aspergillus phoenicis*, and particularly the strains thereof which are identified as *A. phoenicis* Staley 298 (ATCC 13, 156) and Staley 298.3 (ATCC 13, 157), may be used advantageously for the production of large amounts of the enzyme amyloglucosidase by the submerged fermentation technique. The resulting amyloglucosidase liquors are substantially free of alpha amylase and are characterized by their unique ability to digest starch and similar polyanhydroglucosides directly to dextrose with little or no intermediate products of starch digestion such as maltose, maltotriose or dextrin being formed.

Accordingly, a primary object of the invention is the use of *A. phoenicis*, and particularly *A. phoenicis* Staley 298 and Staley 298.3, to produce high yields of amyloglucosidase characterized by its freedom from alpha amylase and its ability to digest starch at high levels of efficiency and to produce therefrom high D.E. syrups from which crystalline dextrose may be readily obtained.

Certain other objects of the invention will, in part, be obvious and will, in part, appear hereinafter.

For a more complete understanding of the nature and scope of the invention, reference may now be had to the following detailed description thereof, wherein certain illustrative embodiments of the invention are set forth.

Amyloglucosidase is a class of starch saccharifying enzymes. It is produced by a wide variety of microorganisms, particularly of the Rhizopus, Mucor, Aspergillus, and Clostridium genera. The name "amyloglucosidase" is used to designate a class of enzymes which are characterized by their property of digesting starch to dextrose with little or no intermediate products of starch digestion, such as maltose, maltotriose, or dextrin being formed. The name or designation, amyloglucosidase, was apparently first used by Cori and Larner (Fed. Proc. (1950), page 9) and Kerr (JACS 73:3916) (1951). These same enzymes had been previously referred to by other writers under the designations gamma amylase, enzyme maltase and gluc amylase. However, the term "amyloglucosidase" is preferred.

The characteristic of the amyloglucosidase enzymes which makes them so attractive is their ability or property to digest starch to dextrose with little or no formation of intermediate products of starch digestion or other undesirable factors. However, not all amyloglucosidase enzymes are identical even though they come within the same class. It has been found that the amyloglucosidase produced in accordance with this invention by means of *A. phoenicis*, particularly *A. phoenicis* Staley 298 and Staley 298.3, has higher potency and is better suited for the production of high D.E. syrup from which crystalline dextrose may be more readily obtained than amyloglucosidase produced by other microorganisms.

Even though amyloglucosidase is a highly efficient producer of dextrose from starch, still considerable quantities of the enzyme are required and therefore the commercial success of a process based on this particular class of enzymes depends upon the ability to produce the enzyme in suitable form and quantity at reasonable cost. As indicated above, it has been found in accordance with the present invention that this can be done by the use of *A. phoenicis*, and particularly *A. phoenicis* Staley 298 and Staley 298.3.

It was found that ordinary yellow corn constituted a good source of *A. phoenicis*. Various cultures were prepared during the course of the experimental work leading to the present invention. While the *A. phoenicis* cultures were, in general, good producers of amyloglucosidase, strains identified as Staley 298 and Staley 298.3 were outstanding in respect to their ability to produce amyloglucosidase enzyme having high potency for the digestion of starch directly to dextrose.

The *A. phoenicis* may be isolated from corn by known techniques using, for example, the following medium:

|  | Percent |
|---|---|
| Corn starch | 1.5 |
| Beef extract | 0.3 |
| Peptone | 0.5 |
| Agar | 1.5 |
| Water | As required |

After a culture of *A. phoenicis* has been isolated, it may be preserved in the usual manner by storing under refrigeration. Fresh master cultures may be prepared each month by the usual technique of transplanting some of the spores from master cultures prepared the previous month.

The two following media have been successfully used in conducting fermentations with *A. phoenicis* cultures to produce large amounts of amyloglucosidase:

A

|  | Percent |
|---|---|
| Corn steep water solids | 5 |
| Ground yellow dent corn | 5 |
| Corn starch | 2 |
| Potassium hydroxide | 0.05 |
| Bjorksten alpha amylase | 0.00225 |
| Water | As required |

B

|  | Percent |
|---|---|
| Corn steep water solids | 5 |
| Ground yellow dent corn | 5 |
| Corn starch | 2 |
| Potassium hydroxide | 0.2 |
| Bjorksten alpha amylase | 0.00225 |
| Water | As required |

The corn, starch, water, and amylase were mixed together, brought to a boil and held at about 100° C. for 30 minutes. The steep water and potassium hydroxide were then added and the resulting medium was dispensed into Erlenmeyer flasks and sterilized as usual.

The fermentations may be carried out in known manner under submerged growth conditions.

EXAMPLE 1

Spore inoculum

Fermentation inoculum was prepared by the growth of the mold on sporulation medium of the following composition:

| | |
|---|---|
| Bran _____grams__ | 5 |
| Solution _____milliliters__ | 4 |
| Solution composition: | |
| Corn steep solids _____percent__ | 5 |
| Dextrose _____do____ | 2 |
| Corn _____do____ | 1 |
| Calcium carbonate _____do____ | 0.5 |
| Water _____ As required | |

The medium was dispensed in 250 ml. Erlenmeyer flasks and sterilized at 15 p.s.i.g. (pounds per square inch gauge) of steam (250° F.) for 60 minutes. The bran flasks were then inoculated with master culture A. phoenicis Staley 298 and incubated at 29–31° C. for 4 days.

The spore suspensions were prepared by shaking the sporulated bran culture with 150 ml. of sterile agar (0.125%) solution and pipetting off the suspended mold spores. If desired, sodium lauryl sulfonate can be included in the agar solution as a wetting agent.

Mold spore concentrations were approximately 60–100,000,000 per ml. of suspension and were used at the rate of one ml. per 25 ml. medium per flask. The exact mold spore concentration was determined for the individual experiment.

Fermentation to produce amyloglucosidase

All fermentations were conducted by growing submerged cultures in 125 ml. Erlenmeyer flasks on a reciprocating type shaker. The shaker was adjusted for a 7 inch stroke length and was operated continuously at 78 r.p.m. Twenty-five ml. of either medium A or medium B above was dispensed in each flask and sterilized at 15 p.s.i.g. steam pressure (250° F.) for 30 minutes. One ml. of the spore suspension as prepared above and containing approximately 80 million spores per milliliter was introduced into each flask. The incubation temperature for all fermentations was 29–31° C. Growth observations were made throughout the fermentation period and flasks were removed for pH and enzyme assay.

Prior to sterilization, the pH of medium A was 4.32 and after sterilization it was 4.40. Prior to sterilization, the pH of medium B was 5.51 and after sterilization it was 5.41. As the fermentations progressed the pH dropped in the flasks and at the end of the fourth day of the fermentations the pH in the flasks containing medium A was 4.02 and in the flasks containing medium B it was 4.10–4.18.

After the fourth day of fermentation the contents of the flasks were assayed. It was found that the enzyme content was practically entirely amyloglucosidase. The enzyme concentration in the flasks originally containing medium A ranged from 50.5–54.5 units and in the flasks originally containing medium B it ranged from 72.5–74.0. One unit of the amyloglucosidase enzyme was taken as that amount of the enzyme required to digest one-tenth gram of starch essentially to dextrose in 48 hours at a pH of 4.0 and at a temperature of 55° C.

Enzyme assays

The enzyme liquors were assayed using 4% starch solution thinned with 0.05 gram Bjorksten alpha amylase per 80 grams of starch. The starch solution was first buffered with 10 cc. of aqueous sodium acetate per liter of the starch solution. The aqueous sodium acetate was prepared by dissolving 10 grams of sodium acetate heptahydrate in 100 cc. of water and adding enough glacial acetic acid to adjust the pH to 4.0. The enzyme conversions were carried out at 55° C. for 48 hours.

A. phoenicis Staley 298 was identified and found to have the following characteristics:

*Colony characters:*
  Rate of growth—rapid
  Texture—uncrowded conidiophores
  Color—chocolate brown—white edge
    Reverse—white
*Heads:*
  Color—chocolate brown
  Form—globose
  Measurements—240–960 microns
*Conidiophore:*
  Length—1920–3850 microns
  Diameters—17–25 microns
  Walls—thickness 1.7–3.3 microns
  Markings—none
  Color—none
*Vesicle:*
  Shape—globose
  Size—71–108 microns
  Color—none
*Primary sterigmata:*
  Measurement—25–46 microns x 4.2–1.3 microns
  Arrangement—fertile over entire area
  Color—none
*Secondary sterigmata:*
  Measurement—10 microns x 3.3 microns
*Conidia:*
  Color—dark to colorless
  Measurement—4.2 microns
  Markings—slightly rough
(Perithecia, Sclerotia and Ascospores—absent)

EXAMPLE 2

Preparation of master cultures

Czapek's solution agar, having the following composition, was prepared by mixing all the ingredients together except the sucrose (to avoid over-heating the sucrose) and autoclaving them for five minutes at 15 p.s.i.g. of steam to dissolve the agar:

| | |
|---|---|
| $NaNO_3$ _____grams__ | 3.0 |
| $K_2HPO_4 \cdot 3H_2O$ _____do____ | 1.0 |
| $MgSO_4 \cdot 7H_2O$ _____do____ | 0.5 |
| KCl _____do____ | 0.5 |
| $FeSO_4 \cdot 7H_2O$ _____do____ | 0.01 |
| Sucrose (good grade) _____do____ | 30.0 |
| Agar _____do____ | 15.0 |
| Water _____ml__ | 1,000 |

After autoclasing, the sucrose was dissolved in the mixture and 5 ml. (milliliters) of the solution were dispensed into each of the required number of 18 x 150 mm. Pyrex tubes. The tubes were then closed with cotton plugs and sterilized at 15 p.s.i.g. of steam pressure for 20 minutes. Upon removing the tubes from the autoclave they were placed in a reclining position so that as gelation occurred during cooling the surface area of the medium was increased. The stock of media thus prepared was stored at 3–10° C. and was replaced with fresh media each month.

A 30-day supply of fresh master culture, A. phoenicis Staley 298.3 was prepared each month by transplanting some of the spores from master cultures prepared the previous month into fresh tubes of Czapek's solution agar medium under aseptic conditions. The inoculated tubes were incubated for 4-5 days at 30-35° C. or until a heavy growth of spores appeared. The mature master cultures were stored at 3-10° C. Old, unused master cultures were discarded.

Spore inoculum

Fermentation inoculum was prepared by the growth of the mold on sporulation medium of the following composition:

| | |
|---|---|
| Bran grams | 5 |
| Solution ml | 4 |

Solution composition:

| | |
|---|---|
| Corn steep solids percent | 5 |
| Dextrose do | 2 |
| Corn do | 1 |
| Calcium carbonate do | 0.5 |
| Water | As required |

The medium was dispensed in 250 ml. Erlenmeyer flasks and sterilized at 15 p.s.i.g. of steam (250° F.) for 60 minutes. The bran flasks were then inoculated with master culture A. phoenicis Staley 298.3 and incubated at 29-31° C. for 5-6 days. The sporulated bran flasks were stored at refrigerator temperature until used.

The spore suspensions were prepared by shaking the sporulated bran culture with 150 ml. of sterile agar (0.125%) solution and pipetting off the suspended mold spores. If desired, sodium lauryl sulfonate can be included in the agar solution as a wetting agent.

Mold spore concentrations were approximately 60-100,000,000 per ml. of suspension and were used at the rate of one ml. per 25 ml. medium per flask. The exact mold spore concentration was determined for the individual experiment.

Fermentation to produce amyloglucosidase

All fermentations were conducted by growing submerged cultures in 125 ml. Erlenmeyer flasks on a reciprocating type shaker. The shaker was adjusted for a 7 inch stroke length and was operated continuously at 78 r.p.m. Twenty-five ml. of basal medium having the composition given below was dispensed in each flask and sterilized at 15 p.s.i.g. stem pressure (250° F.) for 30 minutes. One ml. of the spore suspension as prepared above and containing approximately 80 million spores per milliliter was introduced into each flask. The incubation temperature for all fermentations was 29-31° C. Growth observations were made throughout the fermentation period and flasks were removed for pH and enzyme analyses.

BASAL MEDIUM

| | Percent |
|---|---|
| Starch | 7.0 |
| $(NH_4)_2SO_4$ | 0.7 |
| $K_2HPO_4 \cdot 3H_2O$ | 0.1 |
| $MgSO_4 \cdot 7H_2O$ | 0.05 |
| KCl | 0.05 |
| $FeSO_4 \cdot 7H_2O$ | 0.001 |
| Acetic acid | 0.9 |
| NaOH | 0.54 |
| Water | As required |

At the outset the pH was 5.66. At the end of 42 hours it had risen to 5.82, after which it dropped to 3.88 at the end of 66 hours and to 3.32 at the end of 90 hours.

At the end of 66 hours the enzyme concentration was 26 units per ml. and at the end of 90 hours it was 40 units per ml., one unit of the amyloglucosidase being taken as that amount of the enzyme required to digest one-tenth gram of starch, essentially to dextrose, in 48 hours at pH 4.0 and at a temperature of 55° C.

When the incubation period was approximately complete at the end of 6 days, the resulting amyloglucosidase liquor was drained from the flasks and used to hydrolyze starch to dextrose. The enzyme liquor was light in color, substantially free of bitterness, and edible.

The following table lists the cultural and morphological characteristics of the strain of fungus used in the foregoing example, i.e., A. phoenicis Staley 298.3 and lists the corresponding characteristics of a strain of Aspergillus niger which has been used to produce amyloglucosidase, for comparison.

| Characteristics | A. phoenicis Staley 298.3 | A. niger (N.R.R.L. 337) |
|---|---|---|
| Conidia color | Purple-brown | Purple-brown. |
| Mycellium color | White | Yellow. |
| Pigmentation of Czapek's agar | Usually colorless | Yellow. |
| Conidiophore length, Microns | 1,900-3,850 | 850-1,400. |
| Conidiophore wall-thickness, Microns | 3-4 | 1-3. |
| Conidiophore diameter, Microns | 18-25 | 13. |
| Conidiophore texture, Microns | Uncrowded | Crowded. |
| Head diameter, Microns | 230-960 | 120-480. |
| Vesicle diameter, Microns | 50-110 globose | 45-85 globose. |
| Primary sterigmata length Microns | 33 | 20. |
| Secondary sterigmata length Microns | 11 | 6. |
| Conidia diameter, Microns | 3-5 rough | 3-5 rough. |
| Four-day Czapek's agar, colony size at 30° C. millimeters | 68 | 35. |
| Alpha amylase production, u./ml. | 0-0.1 | 26.7. |
| Amyloglucosidase production, u./ml. | 90-100 | 70-78. |
| Liquor color | Light straw | Yellow-brown. |
| Liquor flavor | Acid-mild bitter | Acid-mild bitter. |

In addition to the Staley 298 and Staley 298.3 strains or cultures, a number of other cultures of A. phoenicis were isolated and found to have similar cultural and morphological characteristics. These included cultures identified as Staley 66, 80, 84, 87, 118 and 120. While these other A. phoenicis cultures are also good producers of amylglucosidase, Staley 298 and Staley 298.3 are preferred.

The amyloglucosidase, preferably as the enzyme liquor, may be used in known manner to convert starch to dextrose. The resulting high D. E. starch conversion liquors may be processed to the form of syrup or the dextrose may be crystallized therefrom.

It will be appreciated by those skilled in the art that the A. phoenicis fungi may be cultured in a number of different ways and that other nutrient media and apparatus may be used in the submerged fermentations to produce the amyloglucosidase. The cost of the enzyme is relatively low since inexpensive media are very satisfactory, yields are high, and the enzyme liquor may be used directly in the conversion of starch, thereby saving the cost of recovering the enzyme.

Having fully described the invention in such particularity that it may readily be practiced by those skilled in the art, what is claimed as new is:

1. The process of producing amyloglucosidase which comprises the submerged cultivation of a culture of Aspergillus phoenicis selected from the group consisting of ATCC 13, 156 and ATCC 13, 157 in a nutrient medium containing assimilable sources of nitrogen, carbon and nutrient minerals.

2. The process of producing dextrose which comprises the submerged cultivation of a culture of Aspergillus phoenicis selected from the group consisting of ATCC 13, 156 and ATCC 13, 157 in a nutrient medium containing assimilable sources of nitrogen, carbon and nutrient minerals so as to produce amyloglucosidase enzyme, and using the resulting amyloglucosidase enzyme to digest starch to dextrose.

3. The process of claim 1 wherein corn steep water solids, ground corn and corn starch constitute the assimilable sources of nitrogen and carbon.

4. The process of claim 2 wherein corn steep water solids, ground corn and corn starch constitute the assimilable sources of nitrogen and carbon.

(References on following page)

References Cited in the file of this patent

UNITED STATES PATENTS

| | | |
|---|---|---|
| 2,531,999 | Wallerstein et al. | Nov. 28, 1950 |
| 2,557,078 | Corman | June 19, 1951 |

OTHER REFERENCES

Schwimmer: Jour. Biol. Chem., 161 (1945), pp. 219–234.

Thom et al.: Manual of The Aspergilli, 1945, Williams & Wilkins, pp. 214, 215, 222, 223.

Corman et al.: Cereal Chem., 25 (1948), pp. 190–200.

Le Mense et al.: "Ind. and Engineering Chem.," vol. 41 (1949), pp. 100 to 103.

Phillips et al.: J. Am. Chem. Soc., 73 (July-Sept. 1951), pp. 3559–3565.

Corman et al.: Cereal Chem., 28 (1951), pp. 280–288.

"Food Technology," vol. 7, No. 1, 1953, pp. 37 and 38.